United States Patent [19]
Kuznicki

[11] Patent Number: 5,627,528
[45] Date of Patent: May 6, 1997

[54] SELECTIVE CALL RECEIVER CAPABLE OF SUSPENDING ACKNOWLEDGE-BACK SIGNALS AND METHOD THEREFOR

[75] Inventor: William J. Kuznicki, Coral Springs, Fla.

[73] Assignee: Motorola, Inc., Schaumburg, Ill.

[21] Appl. No.: 395,254

[22] Filed: Feb. 28, 1995

[51] Int. Cl.$^6$ .................................................. H04Q 7/14
[52] U.S. Cl. ................. 340/825.44; 340/825.54; 455/343; 455/38.3
[58] Field of Search .................... 340/825.44, 825.17, 340/825.54, 636; 455/343, 38.3, 38.2, 38.1, 54; 379/38, 56, 57

[56] References Cited

U.S. PATENT DOCUMENTS

| | | | |
|---|---|---|---|
| 4,755,816 | 7/1988 | DeLuca | 340/825.44 |
| 4,814,763 | 3/1989 | Nelson et al. | |
| 4,928,096 | 5/1990 | Leonardo et al. | |
| 5,031,231 | 7/1991 | Miyazaki | 455/54 |
| 5,047,763 | 9/1991 | Kuznicki et al. | |
| 5,117,449 | 5/1992 | Metroka et al. | |
| 5,124,697 | 6/1992 | Moore | |
| 5,142,279 | 8/1992 | Jasinski et al. | |
| 5,148,473 | 9/1992 | Freeland et al. | |
| 5,153,582 | 10/1992 | Davis | |
| 5,438,607 | 8/1995 | Przygoda, Jr. et al. | 379/38 |
| 5,450,612 | 9/1995 | Canroo et al. | 435/38.1 |

*Primary Examiner*—Edwin C. Holloway, III
*Attorney, Agent, or Firm*—Keith A. Chanroo

[57] ABSTRACT

A selective call system (100) having at least two base sites (120, 122, 124) for communicating with a plurality of selective call receivers (108) wherein at least one of the plurality of selective call receivers having acknowledge-back capability. A base site (110, 122, 114) has a base site transmitter (210) for communicating with a selective call receiver (108) and a base site receiver (214) for receiving an acknowledge-back signal from the selective call receiver (108). The selective call receiver (108) has a receiver (304) for receiving a signal from the base site (110, 122, 114), a decoder/controller (306) coupled to the receiver (304) for decoding the signal received from the base site transmitter (210), a status indicator (504) coupled to the decoder/controller (306) for indicating a predetermined status of a power supply for the selective call receiver (108). The selective call receiver (108) further has an acknowledge-back transmitter (334) coupled to the decoder/controller (306) for transmitting acknowledge-back signals to the base site (110, 122, 114) and an acknowledge-back suspension circuit (310) coupled to the acknowledge-back transmitter (334) for inhibiting transmissions of acknowledge-back signals in response to the status indicator (504).

28 Claims, 5 Drawing Sheets

5,627,528

SELECTIVE CALL RECEIVER CAPABLE OF SUSPENDING ACKNOWLEDGE-BACK SIGNALS AND METHOD THEREFOR

FIELD OF THE INVENTION

This invention relates in general to selective call systems, and in particular to a selective call receiver capable of suspending acknowledge-back responses.

BACKGROUND OF THE INVENTION

In conventional selective call systems, when a selective call receiver is paged, a message is delivered to the selective call receiver by transmitting the message during a predefined time period identifying the selective call receiver to which the message is intended. The selective call receiver, as is well known, battery saves during the other time period until its predetermined time period occurs, during which, the selective call receiver turns-on and checks if a message is addressed to it. If not, the selective call receiver continue its battery save routine. When a message is addressed to the selective call receiver, the selective call systems have no way of telling if or when the message was received. Therefore, the selective call system can retransmit the same message for a predetermine number of times to ensure that the selective call receiver has every opportunity to receive the message. Unfortunately, the retransmission of messages waste valuable air-time.

Acknowledge-back selective call receivers, however, upon receipt of a message, are able to transmit an acknowledge-back response to the selective call system informing it that the message was received. Therefore, with acknowledge-back selective call receivers, the selective call system does not need to continue retransmitting the same message because the acknowledge back response verifies, among other things, that the message was received. Unfortunately, because the selective call receiver is portable and has a limited energy content battery, the transmission of the acknowledge back responses deplete the battery much quicker. As is well known, transmitting require more energy that receiving, therefore, the selective call receiver may receive pages but is unable to transmit the acknowledge-back responses because the battery is so depleted that it is unable to power-up the transmitter even thought the selective call receiver is still able to receive pages. Under these conditions, the selective call system may choose to continue retransmitting the same message although the message was received.

Therefore, what is needed is a selective call receiver that is able to eliminate or reduce the need for the selective call system to continue retransmitting the same messages when no acknowledge-back response will be transmitted.

DESCRIPTION OF A PREFERRED EMBODIMENT

Figure 1:
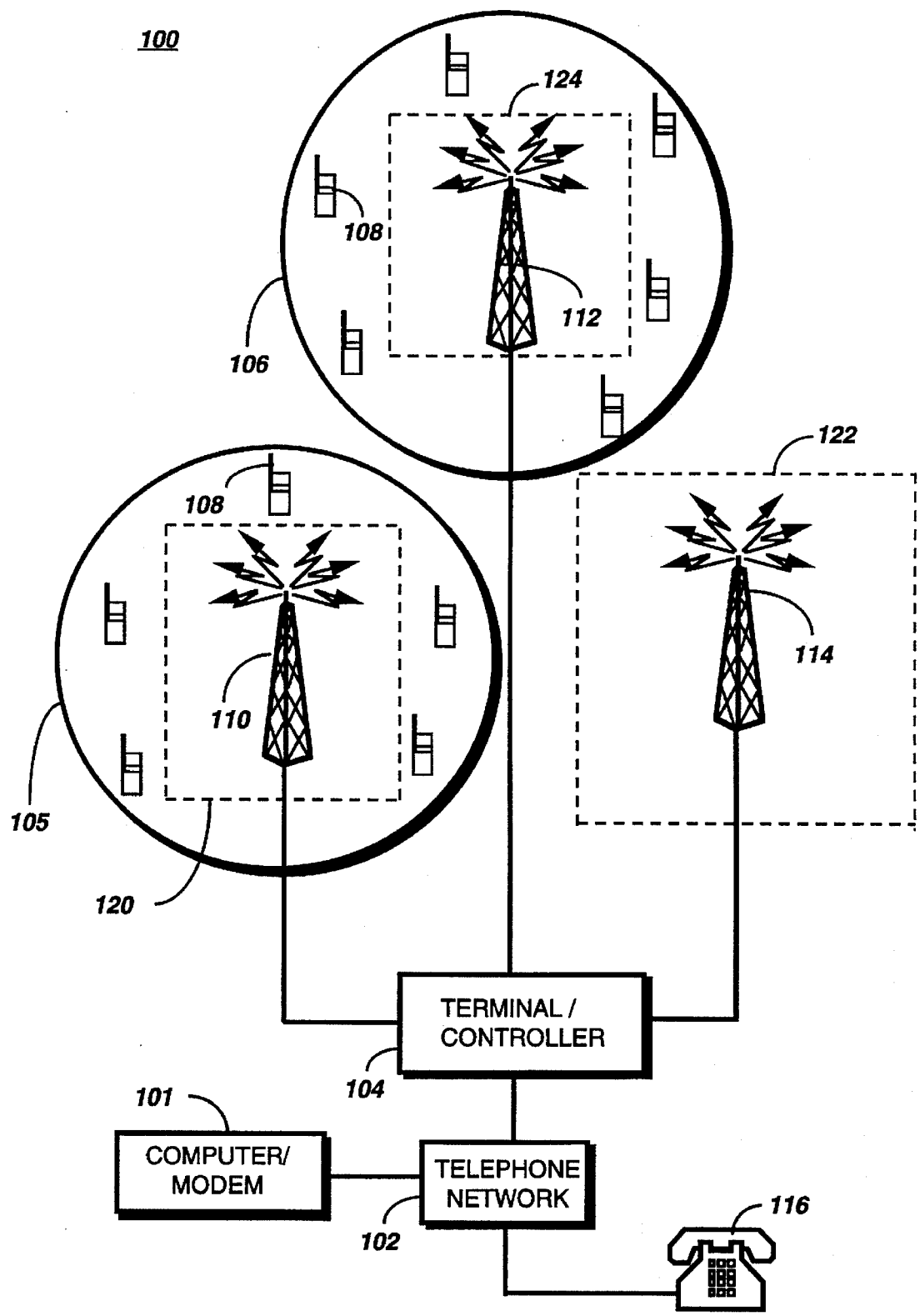
FIG. 1 is an electrical block diagram of a selective call system in accordance with the preferred embodiment of the present invention.

Referring to FIG. 1, a selective call system 100 in accordance with a preferred embodiment of the present invention is shown. The selective call system 100 comprise a terminal/controller 104 coupled to a computer (not shown) via a modem 101 and a telephone 116 via a conventional public or private telephone network 102 known to one of ordinary skill in the art. The telephone network 102 through the base site terminal/controller 104 is coupled to a plurality of selective call base stations (or sites) 120–124. The plurality of selective call base stations 120–124 transmit and receive signals via its respective transmitters/receivers 110–114. The details of the operation of the selective call base stations 110–114 will be discussed below. The plurality of selective call base sites 120–124 have an associated coverage area (for example, 105 and 106) into which signals from the terminal/controller 104 are broadcast and received by at least one of a plurality of selective call receivers 108.

Figure 2:
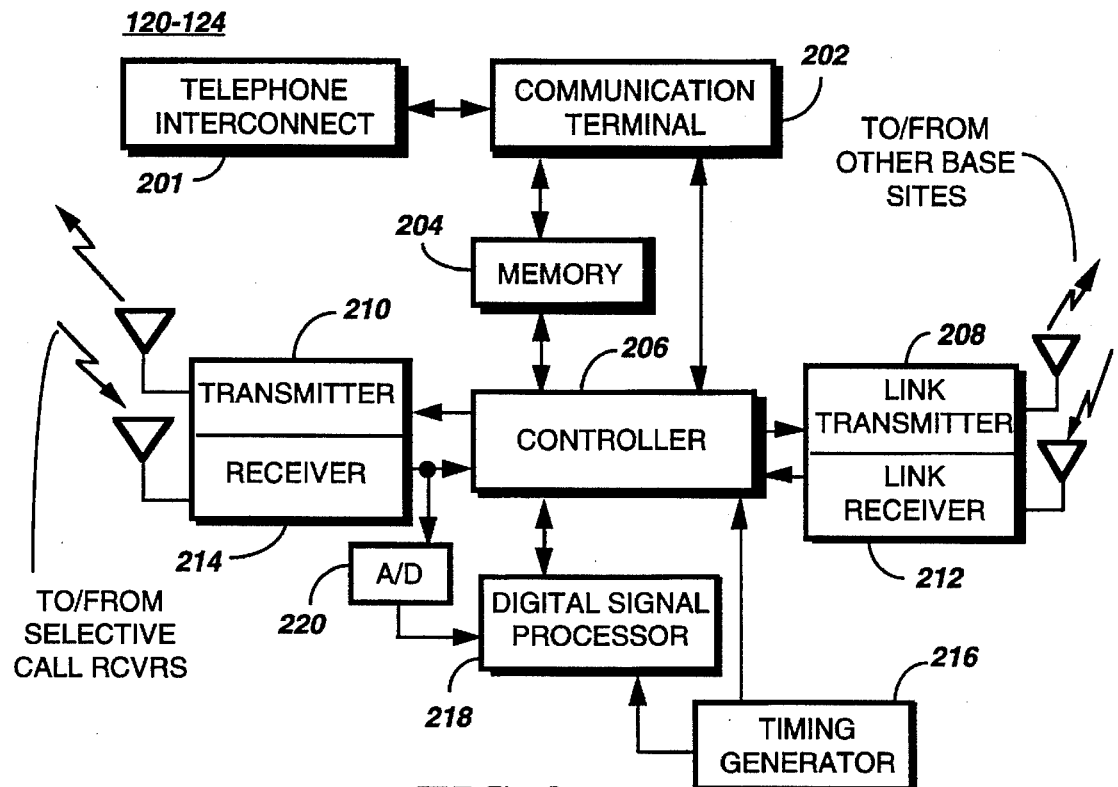
FIG. 2 is an electrical block diagram of a selective call base station in accordance with the preferred embodiment of the present invention.

Referring to FIG. 2, a more detailed block diagram of the selective call base sites 120–124 are shown in accordance with the preferred embodiment of the present invention. The selective call base stations 120–124 comprise a telephone interconnect 201 which allows messages to enter into the selective call system 100 through a public or private telephone network using, for example, a telephone 116, a computer 102, or an alphanumeric entry device (not shown). A communication terminal 202, for example the Motorola's MODEN PLUS Encoder, processes the information received through the telephone interconnect 201. A generated address and message decoded from the received information are stored in a memory 204 until the next transmission cycle.

As shown, the communication terminal 202 is coupled to a controller 206, which controls the operation of a link transmitter 208, a base site transmitter 210, a base site receiver 212, and a receiver 214. An example of a controller suitable for use in the present invention is Motorola's MC6809 controller. A timing generator 216, coupled to the controller 206, provides a high accuracy clock to maintain system timing for communication and synchronization of the selective call system 100 including all the selective call base sites 120–124 and the plurality of selective call receiver 108 by techniques known to one skilled in the arts. Operationally, the base site transmitter 210 transmits, to the plurality of selective call receivers 108, at least one of which has acknowledge-back capabilities, a signal which comprises a paging (selective call) type message preferably on a first frequency at the transmission cycle. Preferably, a group of selective call receivers are intended (addressed) by the base site transmitter 210 to receive the paging message. As is known, the paging message, before it is transmitted, is encoded with the appropriate address for addressing the group of selective call receivers of the plurality of selective call receivers 108. For example, and according to the preferred embodiment of the present invention, when a group of the plurality of the selective call receivers 108 have been paged, the selective call receivers of the group that received the message will substantially simultaneously transmit a response, the acknowledge back signals. Preferably, the acknowledge back (acknowledgment or ack-back) response is transmitted on a second frequency preferably substantially lower than the first frequency. The receiver 214 of the selective call base sites 120–124 receives the acknowledge back response (ack signal or ack-back signal) which is stored in a memory 204. As is well known, the receiver 214 demodulates the ack-back signal to produce preferably a baseband signal. The baseband signal is converted (digitized) from an analog signal to a digital signal by an analog-to-digital (A/D) converter 220 known to one of ordinary skill in the art. The conversion by the A/D converter 220 are received and stored by a digital Signal Processor (DSP) 218. The DSP 218, for example, can include a Motorola's DSP56100 or a Texas Instrument's TMS3000 series digital signal processors. According to the preferred embodiment of the present invention, the DSP 218 stores the digitized samples as digitized bits and continuously receives and stores the digitized samples until all bits of the ack-back signal have been received and stored. The digitized samples are retrieved and each bit decoded. Upon the completion of the decoding of the ack-back signal, the DSP determines whether the selective call receiver has transmitted a status indicator which indicates the suspension, deactivation or disabling the ack-back transmitter or that the selective call receiver is being turned-off or shut off. The DSP also has a timer 402 which is used as a delay circuit for delay the shutting down of the selective call receiver until the selective call system has acknowledges the ack back signal indicating that the selective call receiver 108 will be taken out of service. The operation of the DSP 218 will be discussed in detail below.

Figure 3:
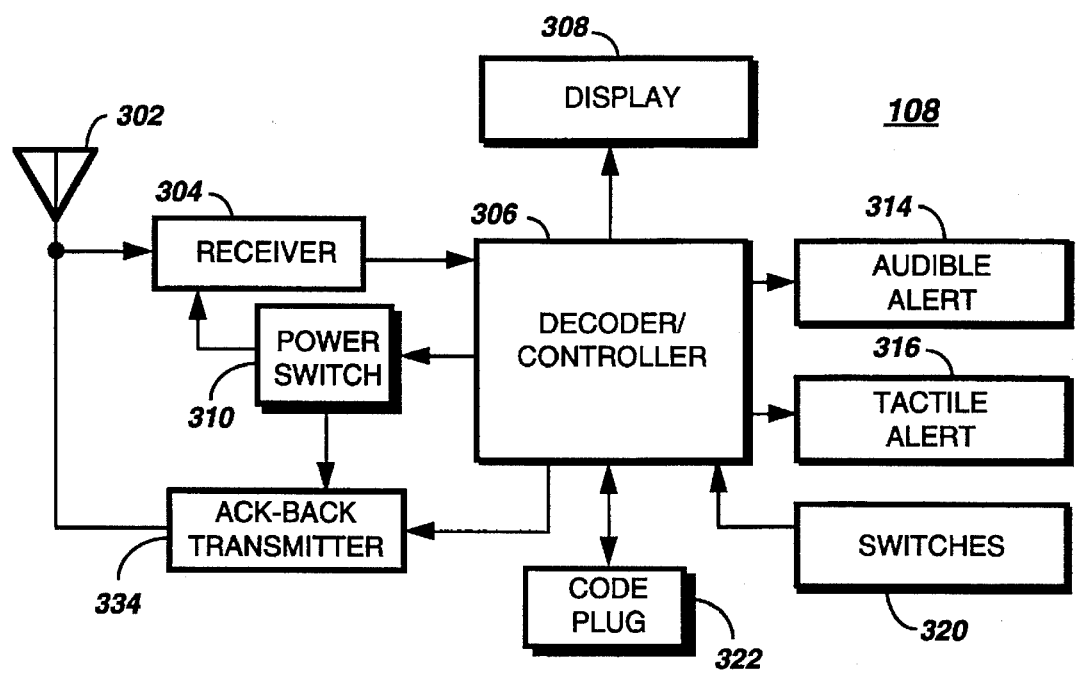
FIG. 3 is an electrical block diagram of a selective call receiver in accordance with the preferred embodiment of the present invention.

Referring to FIG. 3, an electrical block diagram of a selective call receiver is shown in accordance with the preferred embodiment of the present invention. The selective call receiver 108 comprises an antenna 302 for intercepting transmitted radio frequency (RF) signals which are coupled to the input of a receiver 304. The RF signals are preferably selective call (paging) message signals which provide, for example, a receiver address and an associated message, such as voice message. However, it will be appreciated that other well known paging signaling formats, such as tone only signaling or tone, numeric or alphanumeric signaling, would be suitable for use as well. The receiver 304 processes the RF signal and produces at the output a data stream representative of a demodulated data information. The demodulated data information is coupled into the input of a decoder/controller 306 which processes the information in a manner well known in the art. A ack-back transmitter 334 is coupled to the antenna 302 and the decoder/controller 306. A power switch (or ack-back suspension circuit) 310, coupled to the decoder/controller 306, is used to control the supply of power to the receiver 304, thereby providing a battery saving function, and to the transmitter 334 for transmitting the ack-back response subsequent to the receipt of a paging message or to suspend, inhibit or disable the transmission of ack-back responses.

For purposes of this illustration, it will be assumed that the FLEX™ signaling format although other signaling formats could be utilized as well. When the address is received by the decoder/controller 306, the received address is compared with one or more addresses stored in a code plug (memory) 322, and when a match is detected, an alert signal is generated to alert a user that a selective call message, or page, has been received. The alert signal is directed to an audible alerting device 314 for generating an audible alert or to a tactile alerting device 316 for generating a silent vibrating alert. Switches 320 allow the user of the selective call receiver to, among other things, select between the audible alert 314 and the tactile alert 316 in a manner well known in the art.

The message information which is subsequently received is stored in memory 404 (FIG. 4) and can be accessed by the user for display using one or more of the switches 320 which provide such additional functions as reset, read, and delete, etc. Specifically, by the use of appropriate functions provided by the switches 320, the stored message is recovered from memory and processed by the decoder/controller 306 for displaying by a display 308 which enables the user to view the message. The receipt of the message by the selective call receiver 108 can automatically generate the ack-back response to the selective call base station to inform it that the message was successfully received. Preferably, the user will have the opportunity to input a message by using switches 320 or some other input devices well known to one of ordinary skilled in the arts. When the message is entered, the decoder/controller 306 processes the message by encoding an addressed derived from the received message to generate the ack-back response. The encoded ack-back response is then transmitted to the selective call base station that originated the paging message by techniques well known to one of ordinary skill in the art.

According to the preferred embodiment of the present invention, when a message is received, a power level of a battery (not shown) is checked by a level determinator to determine if the power supply is sufficient to transmit an ack-back signal in response to the message received. When the power supply is below a minimum threshold, the decoder/controller 306 sets a status indicator which indicates that no ack back signal will be transmitted to the selective call system and the power switch 310 is used to deactivate or disconnect power to the ack back transmitter 334. Similarly, when the switches 320 are used to turn-off the selective call receiver 108, the ack-back transmitter 334 sets the status indicator and transmit an ack-back signal informing the selective call system that it is being turned off. In this way, the selective call system will not need to waste air time re-transmitting the same message because it will know when the selective call receiver 108 is out of service or when the battery is too discharged to transmit ack-back response.

Figure 4:
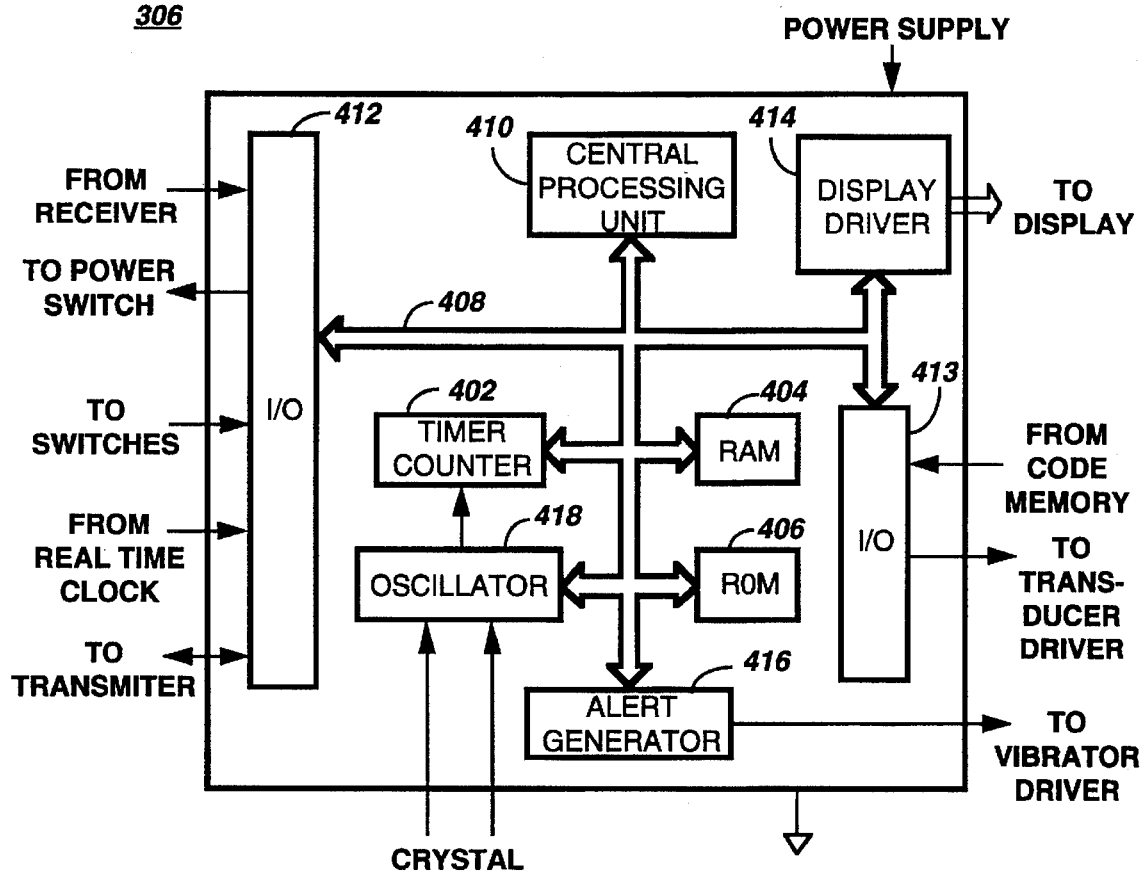
FIG. 4 is an electrical block diagram of a microcomputer based decoder/controller suitable for use in the selective call receiver of FIG. 3.

The controller/decoder 306 of FIG. 3 can be implemented utilizing a microcomputer as shown in FIG. 4. FIG. 4 is an electrical block diagram of a microcomputer based decoder/controller suitable for use in the selective call receiver of FIG. 3. As shown, the microcomputer 306 is preferably of the series microcomputers, such as manufactured by Motorola, Inc., which includes an on-board display driver 414. The microcomputer 306 includes an oscillator 418 which generates the timing signals utilized in the operation of the microcomputer 306. A crystal, or crystal oscillator (not shown) is coupled to the inputs of the oscillator 418 to provide a reference signal for establishing the microcomputer timing. A timer/counter 402 couples to the oscillator 418 and provides programmable timing functions which are utilized in controlling the operation of the receiver or the processor. A RAM (random access memory) 404 is utilized to store variables derived during processing, as well as to provide storage of message information which are received during operation as a selective call receiver. A ROM (read only memory) 406 stores the subroutines which control the operation of the receiver or the processor which will be discussed further. It will be appreciated that in many microcomputer implementations, the programmable-ROM (PROM) memory area can be provided either by a programmable read only memory (PROM) or an EEPROM (electrically erasable programmable read only memory). The oscillator 418, timer/counter 402, RAM 404, and ROM 406 are coupled through an address/data/control bus 408 to a central processing unit (CPU) 410 which performs the instructions and controls the operations of the microcomputer 306.

The demodulated data generated by the receiver is coupled into the microcomputer 306 through an input/output (I/O) port 412. The demodulated data is processed by the CPU 410, and when the received address is the same as stored within the code-plug memory which couples into the microcomputer through, for example an I/O port 413, the message, if any, is received and stored in RAM 404. Recovery of the stored message, and selection of the predetermined destination address, is provided by the switches which are coupled to the I/O port 412. The microcomputer 306 then recovers the stored message and directs the information over the data bus 408 to the display driver 414 which processes the information and formats the information for presentation by a display 308 (FIG. 3) such as an LCD (liquid crystal display). At the time a selective call receiver's address is received, the alert signal is generated which can be routed through the data bus 408 to an alert generator 416 that generates the alert enable signal which is coupled to the audible alert device that was described above. Alternatively, when the vibrator alert is selected, as described above, the microcomputer generates an alert enable signal which is coupled through data bus 408 to the I/O port 412 to enable generation of a vibratory, or silent alert. Switch inputs are received by the I/O port 412 via the data bus 408. The switch inputs are processed by the CPU 410. Specifically, the CPU 410 retrieves the address of the selective call base station from RAM 404 and in conjunction with the timer counter 402 and the oscillator 418, the CPU 410 generates the ack-back signal which is passed via the data bus 408 to the transmitter.

The battery saver operation is controlled by the CPU 410 with battery saving signals which are directed over the data bus 408 to the I/O port 412 which couples to the power switch 310. Power is periodically supplied to the receiver to enable decoding of the received selective call receiver address signals and any message information which is directed to the selective call receiver. Specifically, when the selective call receiver 108 begins decoding the paging signal, the receiver is powered by the power switch. When the paging message is received and stored, the microcomputer 306 sends a signal to the power switch 310 to disable power to the receiver 304 and enable power to the transmitter for transmitting the ack-back signal if the status indicator is not set.

Figure 5:
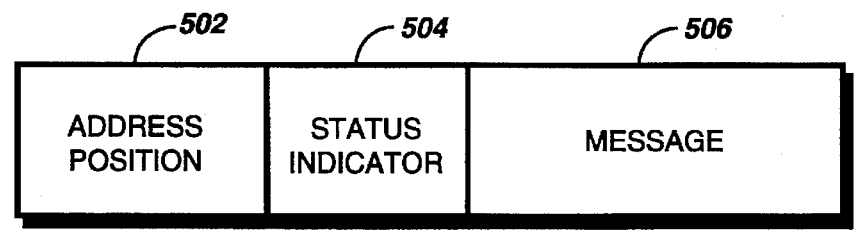
FIG. 5 illustrates an ack-back response in accordance with the preferred embodiment of the present invention.

Referring to FIG. 5, a signal diagram is shown illustrating the ack-back signal or response according the preferred embodiment of the present invention. The ack back signal comprises an address portion 502 indicating the selective call receiver 108 that is transmitting the ack back response, and a status indicator 504 which encodes preferably two bits to indicate the status the selective call receiver. The ack signal also includes a message 506 which is transmitted to the selective call system in response to the paging message received.

Figure 6:
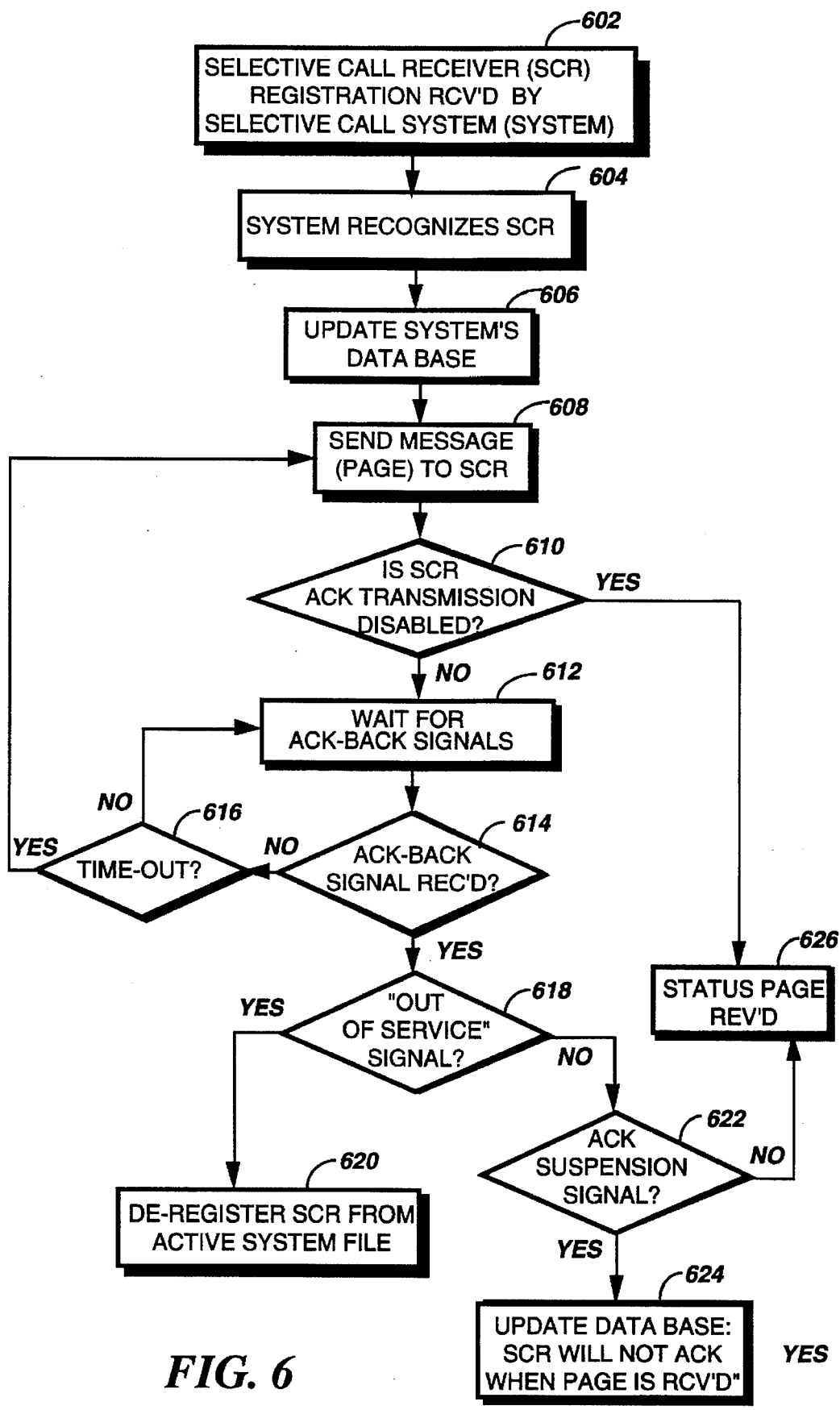
FIG. 6 is a flow diagram illustrating the operation of the selective call system in accordance with the preferred embodiment of the present invention.

Referring to FIG. 6, a flow diagram illustrating the operation of the selective call system according to the preferred embodiment of the present invention. The selective call system comprises a plurality of base sites (or base stations) capable of communicating with at least one of a plurality of selective call receiver having acknowledge back (ack or ack-back) capabilities. The selective call receivers via its ack-back transmitters can send a signal to a base site to register with the selective call systems. When this registration signal is received, the selective call systems determine if the selective call receiver requesting registration is assigned to the selective call system, step 602. If the selective call receiver is assigned to the selective call system, the selective call receiver will recognize the registration by logging or storing the registration information, step 604. Thereafter, the selective call receiver will update its data base to include the registration information of the selective call receiver, step 606. When the registration information is received, the selective call system can determine where the selective call receiver requesting registration is located because the information received also includes the location of the base site that received the information.

When a message designated for a particular selective call receiver or group of selective call receivers, the message is encoded and sent to the selective call receiver or group of selective call receiver targeted at the base site(s) where the selective call receiver(s) is (are) located, step 608. To efficiently use air time, the selective call system may send a "where-are-you" signal to the selective call receiver. The base site that received the ack-back signal of the responding selective call receiver marks (specifies) the location of the selective call receiver. The selective call system thereafter will target further communication with the selective call receiver at the base site of the location identified by the response to the "where-are-you" signal. After a message is sent to the selective call receiver, the selective call system checks if the selective call receiver has informed the selective call system that its ack-back transmitter has been disabled or suspended the transmission of ack-back signals or responses, step 610. If the ack-back signal or response capabilities have been suspended or disabled, the selective call system will not wait for the ack-back response and will log the page sent as received by the selective call receiver when sent, step 626.

Alternatively, when the ack-back capability has not been suspended, step 610, the selective call system waits for the ack-back response or signal, step 612. Step 614 checks if the ack-back signal is received. If not, a time-out period is checked, step 616. If the time-out period has expired, the page may be re-sent to the pager to ensure that it was received, step 608. Alternatively, when the time-out period has not expired, step 614, the selective call system continues to wait until the ack-back signal is received or the time-out period has expired, step 612. At step 614, After, for example, the ack-back signal is received, the selective call receiver checks if an "out of service" signal had been received, step 618. The "out of service" signal indicates that the selective call receiver has been turned-off or shut down. If yes, the selective call system de-registers the selective call receiver from the active list of selective call receiver, step 620. If no, the selective call system checks if the ack suspension signal has been received (if ack-back responses disabled). If disabled, the selective call system updates the data base to indicate that when a selective call receiver or page is sent to that selective call receiver no ack back signal or response will be received, step 624. If the ack back suspension signal was not received or after the selective call system updates the data base to indicate no additional ack will be received, the selective call system indicates that the selective call message sent has been received, step 626.

In this way, a selective call system can determine and store the location of the selective call receiver(s) assigned to the system. The stored location is retrieved to determine the geographic area in which to send the message to a designated selective call receiver instead of simulcasting the information over the entire selective call (paging) network thereby saving airtime. Additionally, the ack-back selective call receivers are capable of informing the selective call system when they are being turned-off and when the battery condition is discharged below a power level sufficient to send ack back responses. This information when received by the selective call system is stored and use to determine when the selective call system is not to expect an ack back signal from the selective call receiver(s) in response to the message sent to the selective call receiver.

Figure 7:
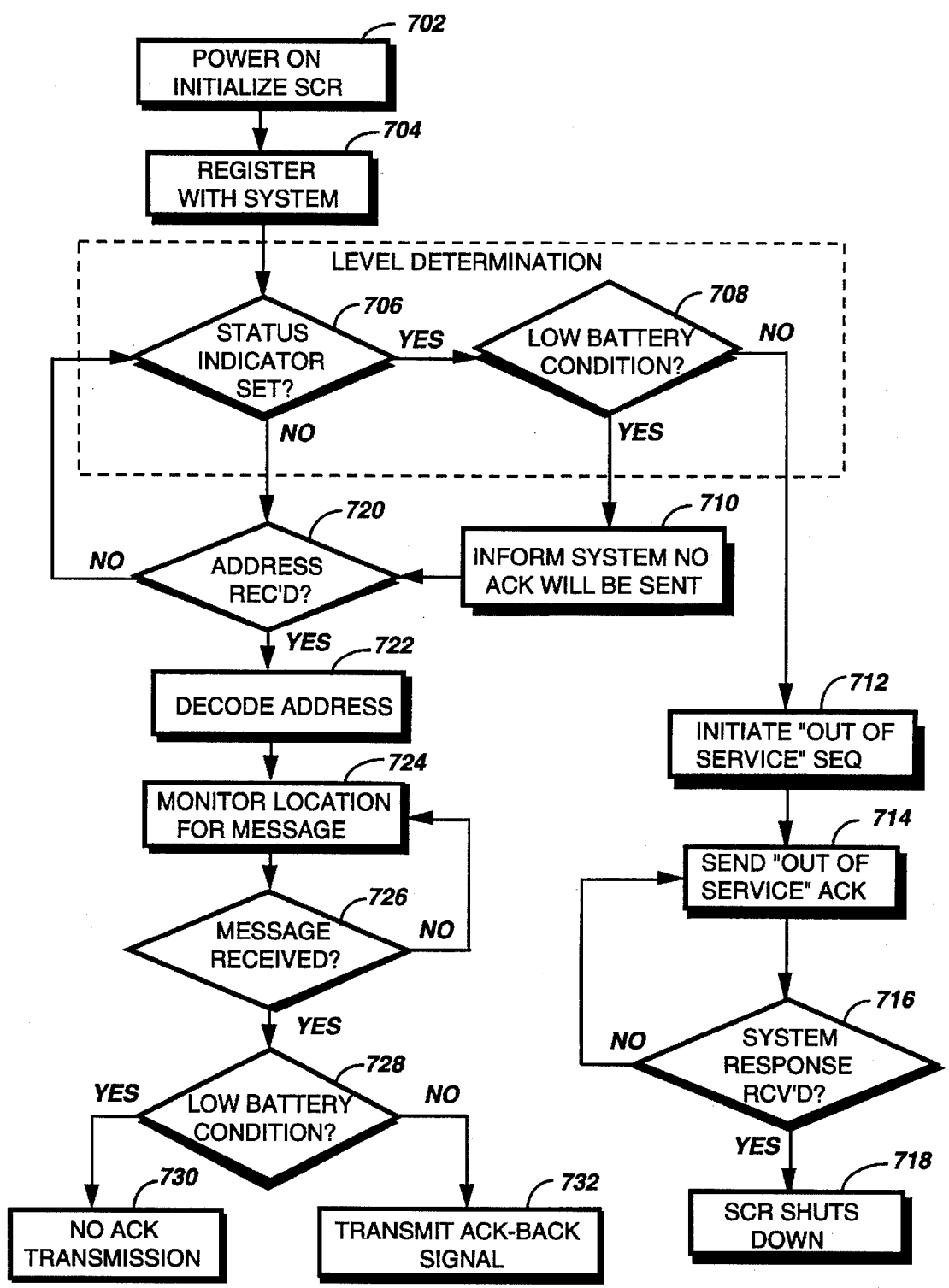
FIG. 7 is a flow diagram illustrating the operation of the selective call receiver in accordance with the preferred embodiment of the present invention.

Referring to FIG. 7, a flow diagram of the selective call receiver is shown in accordance with the preferred embodiment of the present invention. Operationally, when the selective call receiver is turned-up (powered-up) and the initialization of the selective call receiver is complete, step 704, the selective call receiver transmits an acknowledge-back signal to the selective call system to inform the system of its location and the it is active and ready to receive message, step 704. The selective call receiver checks its status, for example the power level of its battery or power supply to determine if the battery has sufficient energy available to transmit an ack back signal in response to a received message, step 706. If a status indicator 504 is set, the selective call receiver checks if the status indicator 504 relates to a low condition battery, 708. If so, the selective call receiver transmits an ack back signal to the selective call system to inform it that no ack back signal will be sent in response to the receipt of the message, step 710. The selective receiver may also include information to inform the selective call system the condition that prevents further ack back signals, for example, low battery or the selective call receiver is being switched-off or shut-down. Alternatively, when the status indicator 504 relates to the selective call receiver being turned-off, the selective call receiver initiate an "out of service" routine or sequence, step 712. "Out of service" routine include events or things that are performed before the selective call receiver allows the battery or the power supply to be disconnected. Thereafter, the selective call receiver transmits an "out of service" message to the selective call system which in turn removes the selective call receiver from the active system list to prevent messages being transmitted to the selective call receiver while it is out of service or turned-off. The selective call system responses to the ack-back signal, step 716. When the response is received, the selective call receiver shuts down, step 718. If the response from the selective call system is not received, the selective call system will retransmit the response from the selective call receiver, step 714.

If the status indicator 504 is not set, the selective call receiver begins searching for address, step 720. If no address is received, the selective call receiver continues by checking the status indicator 504, step 706. When the address is received, the selective call receiver begins decoding the received address, step 722. After the address is decoded, the selective call receiver according to the preferred embodiment begins to search or monitor the location being identified for the message, step 724. Step 726 checks when the message is received. If the message is not received, the process returns to step 726 of monitor the location for the message. Alternatively, when the message is received, the selective call receiver checks the low battery condition, step 728. If the low battery condition is set then the ack back transmitter will be disabled thereby suspending the transmission of ack-back responses, step 730. However, when the low battery condition is not set the ack back signal is transmitted to the selective call system in response to the receipt of the message, step 732.

In this way, when the pager is turned-on or signs-in, it registers with the selective call system by sending an acknowledge signal identifying the selective call receiver. The selective call receiver certifies the selective call receiver by checking to insure that the identification signal refers to valid selective call receiver (selective call receiver assigned to the selective call system. The ack signal from the selective call receiver to the selective call system identifies a valid selective call receiver and also serves to determine the location of the selective call receiver. The receiving base station transfers the ack signal with encoded portion (a color code included with the signal) to identify which base station (receiver/transmitter) received the radio frequency (RF) signal from the selective call receiver. The color code is used by the selective call system to target messages to the selective call receiver thereby eliminating the need for simulcasting which wastes air-time. Therefore, when a message (page) is transmitted to a selective call receiver with acknowledge back capabilities, the selective call receiver will transmit a ack-back signal in respond to the receipt of the message unless its battery supply is discharges below a minimum threshold thus preventing the selective call receiver from sending the ack-back signal.

If the selective call receiver's battery is discharged below a minimum energy threshold, the selective call receiver will transmit an ack-signal to the selective call receiver informing the selective call system that no ack back signal will be sent in response to a message. According to the preferred embodiment of the present invention, the selective call system does not need to resend the message a preset number of times because no ack back signal was received because the selective call system knows that the selective call receiver is on but incapable of sending ack-back signals.

Although a selective call receiver may have registered with the system thereby allowing the system to locate the position of the selective call receiver, the selective call receiver can migrate within in the system. In view of this, the selective call system will periodically or occasionally send a simulcast signal ("where you are" signal or "Where U R" signal) requiring the selective call receiver to respond by transmitting ack back signal. In this fashion the selective call system can determine during non-peak times or other various conditions or times for the selective call receiver to send ack-back signal so the selective call receiver can be located.

Therefore, according to the preferred embodiment of the present invention, the selective call receiver battery or power supply may become discharged to a level where it is preferred to disable or suspend the ack-back signal capability until the battery is replaced of recharged. When this condition occurs, the selective call receiver will send an ack signal to the selective call system informing the system of this condition so when a message is transmitted to the selective call receiver the system knows that the message is received and no ack-back signal will be sent in response thereto. Similarly, when the selective call receiver is being turned-off, it transmits an ack signal deregistering from the active system file so the selective call systems does not send and future message until the selective call receiver re-registers with the system. In this way, air-time is conserved, because the selective call receiver is able to keep the selective call system informed on its current status and when it is being taken out of service to eliminate unnecessary message being sent.

What is claimed is:

1. A selective call system having at least two base sites for communicating with a plurality of selective call receivers wherein at least one of the plurality of selective call receivers having acknowledge-back capability, a base site comprising:

a base site transmitter for communicating with a selective call receiver;

a base site receiver for receiving an acknowledge-back signal from the selective call receiver, the selective call receiver comprising:

a receiver for receiving a signal from the base site;

a decoder/controller, coupled to the receiver, for decoding the signal received from the base site transmitter, the decoder/controller further comprising a status indicator for indicating a predetermined status of a power supply for the selective call receiver;

an acknowledge-back transmitter, coupled to the decoder/controller, for transmitting acknowledge-back signals to the base site wherein said acknowledge-back transmitter, in response to the status indicator transmits a signal to inform the base site that no further acknowledge-back signals will be transmitted; and an acknowledge-back suspension circuit, coupled to the acknowledge-back transmitter, for inhibiting transmissions of acknowledge-back signals in response to the status indicator.

2. The selective call system according to claim 1 wherein the decoder/controller comprising a level determinator for determining when the power supply is depleted below a minimum threshold.

3. The selective call system according to claim 2 wherein the minimum threshold indicates a power level of the power supply incapable of providing sufficient power to the acknowledge-back transmitter for further transmission of acknowledge-back signals.

4. The selective call system according to claim 1 wherein the decoder/controller further comprising a delay circuit for delaying a disconnection of the power supply of the selective call receiver until said acknowledge-back transmitter transmits the signal for informing the base site that the selective call receiver is being shut-down.

5. The selective call system according to claim 4 wherein the predetermined status comprises a deactivation of a power switch.

6. A selective call system having at least two base sites for communicating with a plurality of selective call receivers wherein at least one of the plurality of selective call receivers having acknowledge-back capability, a base site comprising:

a base site transmitter for transmitting a message to a selective call receiver;

a base site receiver for receiving an acknowledge-back signal from the selective call receiver receiving the message, the selective call receiver comprising:

a receiver for receiving the message;

a decoder/controller, coupled to the receiver, for decoding the message received from the base site, the decoder/controller further comprising a status indicator for indicating a predetermined status of a power supply of the selective call receiver;

an acknowledge-back transmitter, coupled to the decoder/controller, for transmitting the acknowledge-back signal in response to the receiver receiving the message wherein said acknowledge-back transmitter, in response to the status indicator, transmits a signal to inform the base site that no further acknowledge-back signal will be transmitted;

an acknowledge-back suspension circuit, coupled to the acknowledge-back transmitter, for suspending transmissions of the acknowledge-back signal in response to the status indicator.

7. The selective call system according to claim 6 wherein the decoder/controller comprising a level determinator for determining when the power supply is depleted below a minimum threshold.

8. The selective call system according to claim 7 wherein the minimum threshold indicates a power level of the power supply incapable of providing sufficient power to the acknowledge-back transmitter for additional transmissions of acknowledge-back signals.

9. The selective call system according to claim 6 wherein the decoder/controller further comprising a delay circuit for delaying a disconnection of the power supply of the selective call receiver until said acknowledge-back transmitter transmits the signal for informing the base site that the selective call receiver is being shut-down.

10. The selective call system according to claim 9 wherein the predetermined status comprises a deactivation of a power switch.

11. A selective call receiver having acknowledge-back capabilities, comprising:

a receiver for receiving messages;

a decoder/controller, coupled to the receiver, for decoding the messages being received, the decoder/controller comprising a status indicator for indicating a predetermined status of a power supply;

an acknowledge-back transmitter, coupled to the decoder/controller, for transmitting acknowledge-back signals wherein said acknowledge-back transmitter, in response to the status indicator, transmits a signal to inform a selective call system that no further acknowledge-back signals will be transmitted; and an acknowledge-back suspension circuit, coupled to the acknowledge-back transmitter, for inhibiting transmissions of acknowledge-back signals in response to the status indicator.

12. The selective call receiver according to claim 11 wherein the decoder/controller comprising a level determinator for determining when the power supply is depleted below a minimum threshold.

13. The selective call receiver according to claim 12 wherein the minimum threshold indicates a power level of the power supply incapable of providing sufficient power to the acknowledge-back transmitter for additional transmissions of acknowledge-back signals.

14. The selective call receiver according to claim 13 wherein the decoder/controller further comprising a delay circuit for delaying a disconnection of the power supply until said acknowledge-back transmitter transmits the signal for informing the selective call system that the selective call receiver is being shut-down.

15. The selective call receiver according to claim 14 wherein the predetermined status comprises a deactivation of a power switch.

16. A selective call receiver having acknowledge-back capabilities for receiving messages from a plurality of base sites comprising:

a receiver for receiving the messages;

a decoder/controller, coupled to the receiver, for decoding the messages being received the decoder/controller comprising a status indicator for indicating a predetermined status of a power supply of the selective call receiver;

an acknowledge-back transmitter, coupled to the decoder/controller, for transmitting acknowledge-back signals in response to the receiver receiving the messages wherein said acknowledge-back transmitter, in response to the status indicator, transmits a signal to inform the selective call system that no further acknowledge-back signals will be transmitted; and an acknowledge-back suspension circuit, coupled to the acknowledge-back transmitter, for suspending transmissions of the acknowledge-back signals in response to the status indicator.

17. The selective call receiver according to claim 16 wherein the decoder/controller comprising a level determinator for determining when the power supply is depleted below a minimum threshold.

18. The selective call receiver according to claim 17 wherein the minimum threshold indicates a power level of the power supply incapable of providing sufficient power to the acknowledge-back transmitter for further transmission of acknowledge-back signal.

19. The selective call receiver according to claim 16 wherein the decoder/controller further comprising a delay circuit for delaying a disconnection of the power supply until said acknowledge-back transmitter transmits the signal for informing a selective call system that the selective call receiver is being shut-down.

20. The selective call receiver according to claim 19 wherein the predetermined status comprises a deactivation by a power switch.

21. In a selective call receiver having acknowledge-back capabilities, a method for suspending acknowledge-back signals comprising the steps of:

(a) receiving messages;

(b) decoding the messages being received;

(c) indicating when a predetermined status has been satisfied;

(d) transmitting acknowledge-back signals, said step of transmitting, in response to the predetermined status being satisfied, transmits a signal to inform a selective call system that no further acknowledge-back signals will be transmitted; and (e) inhibiting step (d) in response step (c) indicating that the predetermined status has been satisfied.

22. The method according to claim 21 wherein the step (d) of indicating indicates that the predetermined status is satisfied when a power supply is discharged to a minimum threshold.

23. The method according to claim 21 further comprising a step of delaying a disconnection to a power supply until the step (d) of transmitting transmits an acknowledge-back signal for informing a selective call system when the selective call receiver is being shut-down.

24. In a selective call receiver having acknowledge-back capabilities, a method for suspending acknowledge-back signals comprising the steps of:

(a) receiving a signal;

(b) decoding the signal received;

(c) indicating when a predetermined status has been satisfied;

(d) transmitting acknowledge-back signals in response the signal received, said step of transmitting, in response to the predetermined status being satisfied, transmits a signal to inform a selective call system that no further acknowledge-back signals will be transmitted; and (e) suspending the step (c) of transmitting acknowledge-back signals in response to the step (d) indicating that the predetermined status has been satisfied.

25. The method according to claim 24 wherein the step (d) of indicating indicates that the predetermined status is satisfied when a power supply is discharged to a minimum threshold.

26. The method according to claim 24 further comprising a step of delaying a disconnection to a power supply until the step (d) of transmitting transmits an acknowledge-back signal for informing a selective call system when the selective call receiver is being shut-down.

27. A selective call receiver having acknowledge-back capabilities, comprising:

a receiver for receiving messages;

a decoder/controller, coupled to the receiver, for decoding the messages being received, the decoder controller comprising a status indicator for indicating when a level of a power supply is depleted below a minimum threshold;

an acknowledge-back transmitter, coupled to the decoder/controller, for transmitting acknowledge-back signals wherein said acknowledge-back transmitter, in response to the status indicator, transmits a signal to inform a selective call system that no further acknowledge-back signals will be transmitted; and an acknowledge-back suspension circuit, coupled to the acknowledge-back transmitter, for inhibiting transmissions of acknowledge-back signals in response to the status indicator.

28. A selective call system having at least two base sites for communicating with a plurality of selective call receivers wherein at least one of the plurality of selective call receivers having acknowledge-back capability, a base site comprising:

a transmitter for communicating with a selective call receiver;

a base site receiver for receiving an acknowledge-back signal from the selective call receiver, the selective call receiver comprising:

a receiver for receiving a signal from the base site;

a decoder/controller, coupled to the receiver, for decoding the signal received from the base site, the decoder/controller comprising a status indicator indicating when a level of a power supply is depleted below a minimum threshold;

an acknowledge-back transmitter, coupled to the decoder/controller, for transmitting acknowledge-back signals to the base site wherein said acknowledge-back transmitter, in response to the status indicator, transmits a signal to inform the base site that no further acknowledge-back signals will be transmitted; and an acknowledge-back suspension circuit, coupled to the acknowledge-back transmitter, for inhibiting transmissions of acknowledge-back signals in response to the status indicator indicating when the level of the power supply is depleted below the minimum threshold.

* * * * *

UNITED STATES PATENT AND TRADEMARK OFFICE
CERTIFICATE OF CORRECTION

PATENT NO.  : 5,627,528
DATED       : May 6, 1997
INVENTOR(S) : William J. Kuznicki It is certified that error appears in the above-indentified patent and that said Letters Patent is hereby corrected as shown below:

Claim 1, Column 9, line 20, after indicator, insert --,--.

Claim 6, Column 9, line 68, after transmitted;, insert --and--.

Claim 16, Column 10, line 64, after received, insert --,--.

Signed and Sealed this

Nineteenth Day of May, 1998

*Attest:*

BRUCE LEHMAN

*Attesting Officer*   Commissioner of Patents and Trademarks